Dec. 9, 1924.

E. GERARD-FESTENBURG

MILK BOILING VESSEL

Filed Feb. 12, 1924

1,518,142

INVENTOR
Emile Gérard-Festenburg
BY
ATTORNEY

Patented Dec. 9, 1924.

1,518,142

UNITED STATES PATENT OFFICE.

EMILE GÉRARD-FESTENBURG, OF NEW YORK, N. Y.

MILK-BOILING VESSEL.

Application filed February 12, 1924. Serial No. 692,362.

*To all whom it may concern:*

Be it known that I, EMILE GÉRARD-FESTENBURG, citizen of the United States, residing at New York city, in the county of New York and State of New York, have invented certain new and useful Improvements in Milk-Boiling Vessels, of which the following is a specification.

This invention relates to a vessel in which liquids may be boiled, and which may be used in the boiling of liquids developing a scum which must be removed, or in heating or boiling any desired liquid.

The invention has for an object the provision of means for catching the overflow of the boiling liquid and returning all or part of said overflow to the receptacle.

For further comprehension of the invention, and of the objects and advantages thereof, reference will be had to the following description and accompanying drawing, and to the appended claims in which the various novel features of the invention are more particularly set forth.

Fig. 1 of the drawing is a perspective view showing my improved vessel.

Figure 1:
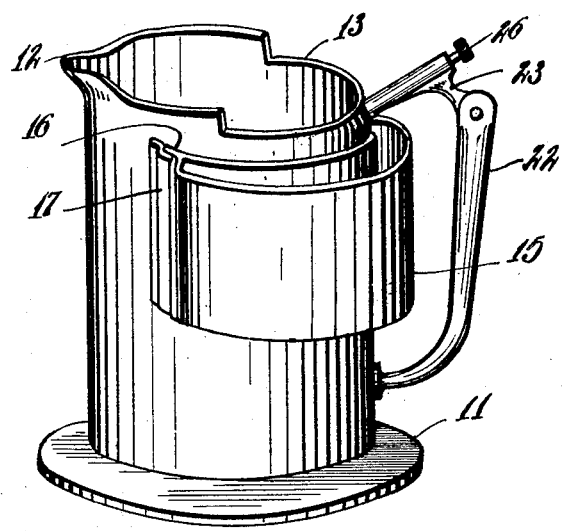
Figure 2:
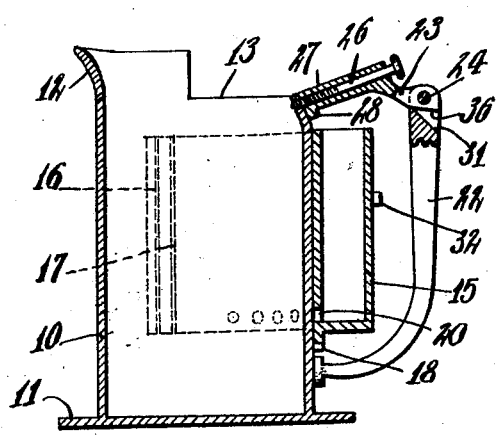
Fig. 2 is a central longitudinal vertical sectional view thereof.

As here shown my improved liquid heating vessel comprises a main body 10 which is here of upright cylindrical form although the precise shape may be varied to suit selected conditions, and which has a widened base 11 formed thereon. At its upper end this vessel may be formed on its forward side with a spout projection 12 while the rear half of the vessel is of less height than the front half as shown at 13 to direct the liquid overflowing into a supplementary receptacle 15 surrounding the rear half of the main vessel. This supplementary receptacle is of generally semi-annular form, and its inner wall fits snugly against the wall of the main vessel 10 as shown, the receptacle being of less height than the main vessel and having its top a short distance below the top edge of the rear portion of the said main vessel. At its ends this supplementary receptacle is formed with vertical flanges 16 which engage in guide members 17 on wall of the main vessel whereby the supplementary receptacle is adjustably retained in place on the main vessel, the receptacle resting on a stop member 18 on the main vessel. Formed in the inner wall of the supplementary receptacle 15 are several openings 20 which are located adjacent the bottom of said receptacle and through which the overflow liquid may be directed back into the main vessel.

The main vessel is provided with a handle comprising a main body 22 which is fixed at its lower end, and a top part or arm 23 which is hinged as at 24 to the upper end of the handle body 22 and normally projects over the top of the supplementary receptacle 15. This arm is formed with a laterally offset end 23' through which is passed a screw 26 which is threaded into a socket 27 in the wall of the main vessel 10. Formed on the end of the arm 23 is a downwardly projecting lip 28 which is adapted to form a stop to limit the upward movement of the receptacle when the latter has been raised enough to bring the openings 20 therein above the top of the main vessel, the arm 23 being formed with an extension 30 adapted to engage a stop shoulder 31 on the handle body 22 to limit upward swinging movement of the arm. The receptacle 15 is formed with a projecting lug 32 which engages said lip 28.

When the heated liquid overflows it is discharged into the receptacle 15 and by raising the latter all or part of said liquid may be again discharged into the main vessel.

Figure 3:
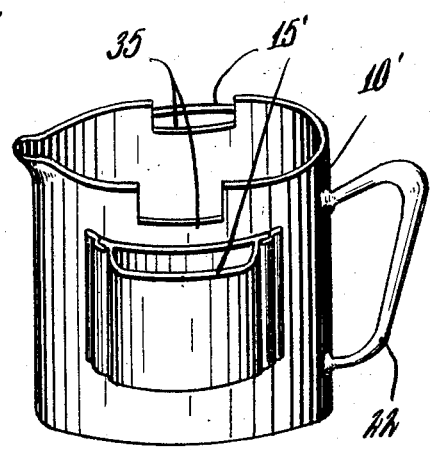
Fig. 3 is a perspective view showing a modified construction.

In Fig. 3 of the drawing I have shown a modification of the construction in which the main vessel 10' is cut out at opposite sides as at 35 to form overflow outlets, while a pair of supplementary receptacles 15' to receive the overflow are attached to the sides of the main vessel under said outlets.

Having thus described my invention what I claim as new and desire to protect by Letters Patent of the United States is as follows:

1. A device of the class described comprising a main vessel formed with a discharge spout on one side thereof; and a supplementary receptacle mounted thereon and partially surrounding the opposite side of the main vessel, the portion of the said vessel surrounded by the supplementary receptacle being of less height than the other portion.

2. A device of the class described comprising a main vessel and a supplementary vessel mounted thereon to receive overflow from the said main vessel, said supplementary vessel having a normally closed discharge opening adjacent the bottom thereof and being adapted for vertical adjustment to bring the said discharge opening above the top of the main vessel.

3. A device of the class described comprising a main vessel and a supplementary vessel mounted thereon to receive overflow from the said main vessel, said supplementary vessel having a normally closed discharge opening adjacent the bottom thereof and being adapted for vertical adjustment to bring the said discharge opening above the top of the main vessel, said supplementary vessel surrounding the rear portion of the main vessel, and said rear portion being of less height from the front portion of the main vessel to direct the overflow from said main vessel from said vessel into said supplementary receptacle.

4. A device of the class described comprising a main vessel and a supplementary vessel mounted thereon to receive overflow from the said main vessel, said supplementary vessel having a normally closed discharge opening adjacent the bottom thereof, and being adapted for vertical adjustment to bring the said discharge opening above the top of the main vessel, and a handle on said main vessel having a hinged arm projecting across the top of the said receptacle to removably engage the said main vessel.

5. A device of the class described comprising a main vessel and a supplementary vessel mounted thereon to receive overflow from the said main vessel, said supplementary vessel having a normally closed discharge opening adjacent the bottom thereof, and being adapted for vertical adjustment to bring the said discharge opening above the top of the main vessel, and a handle on said main vessel having a hinged arm projecting across the top of the said receptacle to removably engage the said main vessel, said arm forming a stop element, when swung upward, limiting upward movement of said receptacle.

In testimony whereof I have affixed my signature.

EMILE GÉRARD-FESTENBURG.